United States Patent [19]

McNinch, Jr.

[11] Patent Number: 4,984,852
[45] Date of Patent: Jan. 15, 1991

[54] TRAILER MOUNTED TRACTOR-TRAILER BRAKE CONTROL SYSTEM

[75] Inventor: Joseph H. McNinch, Jr., Livonia, Mich.

[73] Assignee: Eaton Corporation, Cleveland, Ohio

[21] Appl. No.: 80,279

[22] Filed: Jul. 31, 1987

Related U.S. Application Data

[63] Continuation-in-part of Ser. No. 43,009, Apr. 27, 1987, Pat. No. 4,818,035.

[51] Int. Cl.$^5$ .................. B60T 8/00; B60T 7/20
[52] U.S. Cl. ........................... 303/15; 188/3 R; 188/112 R; 303/7; 303/9.62; 303/22.1
[58] Field of Search ............... 280/DIG. 14, 432, 433; 188/3 R, 112, 195, 181 A; 303/6 M, 7, 14–17, 20, 22 A, 22 R, 93, 97, 100, 106

[56] References Cited

U.S. PATENT DOCUMENTS

| | | | |
|---|---|---|---|
| 3,486,799 | 12/1969 | Greentree | 303/7 |
| 3,767,270 | 10/1973 | Urban | 303/7 |
| 3,768,872 | 10/1973 | Urban et al. | 303/7 |
| 3,854,556 | 12/1974 | Gee | 188/181 R |
| 3,893,696 | 8/1975 | Urban et al. | 303/40 |
| 3,909,075 | 9/1975 | Pittet, Jr. et al. | 303/20 X |
| 3,929,382 | 12/1975 | McNinch, Jr. et al. | |
| 3,929,383 | 12/1975 | Urban et al. | 303/40 |
| 3,955,652 | 5/1976 | Nilsson et al. | 303/7 X |
| 3,966,267 | 6/1976 | McNinch, Jr. et al. | 303/20 |
| 4,050,550 | 9/1977 | Grossner et al. | 303/7 |
| 4,060,284 | 11/1977 | Steiner | 303/93 X |
| 4,231,442 | 11/1980 | Birkeholm | 280/432 X |
| 4,327,414 | 4/1982 | Klein | 364/426 |
| 4,457,407 | 7/1984 | Monick et al. | 188/71.9 |
| 4,476,968 | 10/1984 | Urban et al. | 188/329 |
| 4,591,213 | 5/1986 | Rapoport | 303/93 |
| 4,606,586 | 8/1986 | Eckert et al. | 303/93 |
| 4,616,881 | 10/1986 | Mueller et al. | 303/7 |

FOREIGN PATENT DOCUMENTS 8602323  4/1986  PCT Int'l Appl. ............ 188/112 R Primary Examiner—Duane A. Reger
Attorney, Agent, or Firm—H. D. Gordon

[57] ABSTRACT

A tractor-(28) trailer (30) vehicle (24) brake system control for distributing the brake effort to obtain inter-tractor-trailer proportional braking ($H_1/V_1 = H_2/V_2$) by use of sensors (80, 170, 172) mounted to the trailer only is provided. The control system senses (80) acceleration (a) and the ratio of vertical to horizontal forces ($H_F/V_F$) at the fifth wheel/king pin connection (34/176) by means of sensors (170, 172) mounted to the trailer (30) only and modulates the trailer sub-vehicle brakes only to cause the ratio $H_F/V_F$ to equal a function of acceleration.

4 Claims, 2 Drawing Sheets

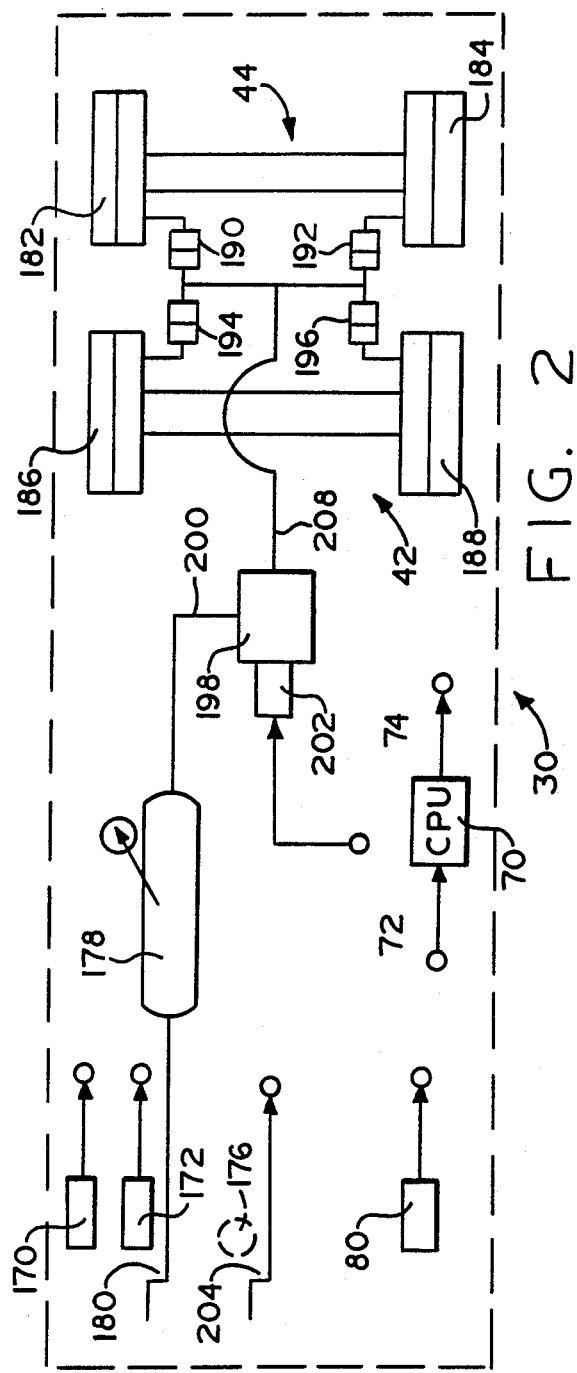
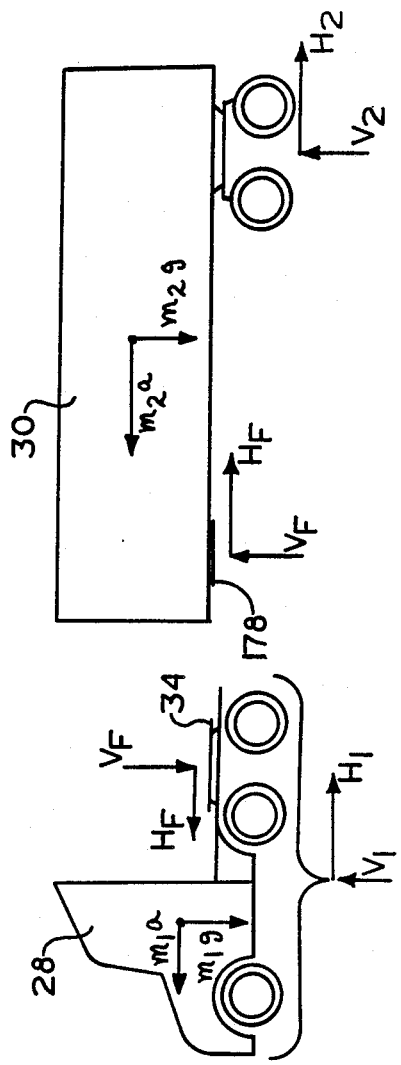
FIG. 2
FIG. 4

TRAILER MOUNTED TRACTOR-TRAILER BRAKE CONTROL SYSTEM

CROSS-REFERENCE TO RELATED APPLICATION

This application is a continuation-in-part of my co-pending application, U.S. Ser. No. 043,009, filed Apr. 27, 1987, now U.S. Pat. No. 4,818,035.

BACKGROUND OF THE INVENTION

1. Field of the Invention

This invention relates to controls for brake systems for multiple vehicle systems (i.e. tractor-trailer vehicles). In particular, this invention relates to brake system controls mounted on the trailer only which will distribute the braking effort between the vehicle brake sites, such as between the sub-vehicle brake systems, to achieve inter-tractor-trailer proportional braking.

2. Description of the Prior Art

Brake systems, and the controls therefore, for vehicles, including heavy duty vehicles such as trucks, are, of course, well known in the prior art.

Brake systems for passenger cars are, in general, somewhat easier to design than brake systems for heavy duty vehicles such as trucks as the loading of passenger vehicles will not vary to the extent loading will vary on the tractor of a tractor-trailer which may comprise a tractor only, a tractor with an empty or lightly loaded trailer or a tractor with a heavily loaded trailer.

Brake systems of the anti-lock type, for all types of vehicles, are well known in the prior art. Briefly, these systems operate to obtain a maximized vehicle stability (i.e. maximized transverse coefficient of friction of braked wheels) by maintaining the longitudinal slip of the braked wheels within predetermined limits. This usually requires modulating the braking forces on an individual wheel and/or individual axle basis to maintain at least some wheel rotation.

Examples of prior art anti-lock systems may be seen by reference to U.S. Pat. Nos. 3,767,270; 3,768,872; 3,854,556; 3,893,696; 3,929,383; 3,929,382; 3,966,267; 4,392,202 and 4,591,213, the disclosures of all of which are hereby incorporated by reference.

Brake systems which control braking to achieve a driver demand, sensed driver demand in "brake-by-wire" manner, sense coefficient of friction and modified brake forces accordingly, sense load on a wheel and modified braking effort accordingly, sense wheel slip and/or used electronic signals to achieve more rapid trailer brake response are also disclosed in the prior art as may be seen by reference to U.S. Pat. Nos. 4,140,352; 4,327,414; 4,494,199; 4,512,615; 4,545,240; 4,591,213; 4,606,586; 4,616,881; and 4,648,663, the disclosures of which are hereby incorporated by reference.

While the prior art brake systems which modify braking effort in response to sensed parameters to achieve various goals, such as vehicle stability or the like, do, in general, provide enhanced vehicle braking, they are subject to further improvement. In the prior art systems for tractor-trailer vehicles, if braking effort between the tractor and trailer is to be controlled in a predetermined manner, specially configured and equipped tractors and trailers were required.

SUMMARY OF THE INVENTION

In accordance with the present invention, many of the drawbacks of the prior art have been overcome or minimized by the provision of a vehicle brake control system particularly well suited for heavy duty articulated multiple vehicle systems such as tractor-trailers. The system, which utilizes sensors mounted on the trailer only and is compatible with standard tractor brake systems provides the advantage of improved performance as to safety while being of a relatively lower cost than prior art brake systems.

The above is accomplished by providing a brake control system having means to sense brake effort required by the operator (usually sensed as a pilot signal from the tractor to the trailer) and means to distribute the braking effort between the sub-vehicle brake systems to achieve inter-sub-vehicle proportioned braking.

When installed in a tractor-trailer, the system preferably includes trailer mounted acceleration sensors and load sensors in the connecting apparatus (i.e. the king pin/fifth wheel) which will allow inter-tractor-trailer proportional braking without requiring specialized equipment on the tractor.

Accordingly, it is an object of the present invention to provide an improved vehicle braking system control for distributing the braking effort between the tractor and trailer brake systems to achieve inter-tractor-trailer proportional braking.

This and other objectives and advantages of the present invention will become apparent from a reading of the detailed disclosure of the preferred embodiments taken in connection with the drawings.

BRIEF DESCRIPTION OF THE DRAWINGS

FIG. 2 is a schematic illustration of the trailer brake system of the present invention.

FIG. 4 is an equilibrium force diagram for the multiple vehicle system of FIG. 1.

DESCRIPTION OF THE PREFERRED EMBODIMENT

Figure 3:
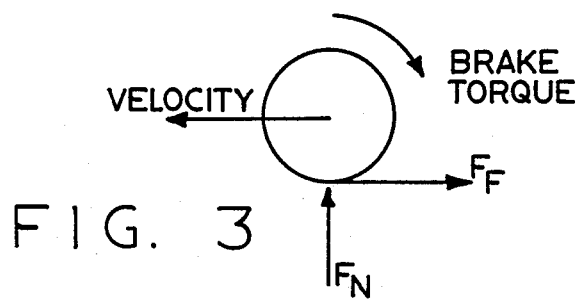
FIG. 3 is a force diagram for a braked wheel.

The type of braking called "proportional braking" is well known in the vehicle industry and involves the "braking ratio", which is the ratio of tangential friction force to radial load (i.e. $F_F/F_N$ in FIG. 3) for the tire/road interface.

The limiting value, of course, is the coefficient of friction ("MU"). If each wheel or set of wheels develops tangential friction force (or braking force) to load in the same proportion, or ratio, then, to the extent each of the wheels have equal MU to slip relationships, the vehicle can utilize all of the available adhesion on all of its wheels at the same time. This principal and the advantageous effects of achieving equal or predetermined related braking ratios is well known in the braking industry.

Specifically proportional braking, as used herein means a braking effort distribution on a vehicle where the ratio of tangential braking force to radial load force is (or very nearly is) the same for all wheels or sets of wheels or is related in a predetermined manner.

Figure 1:
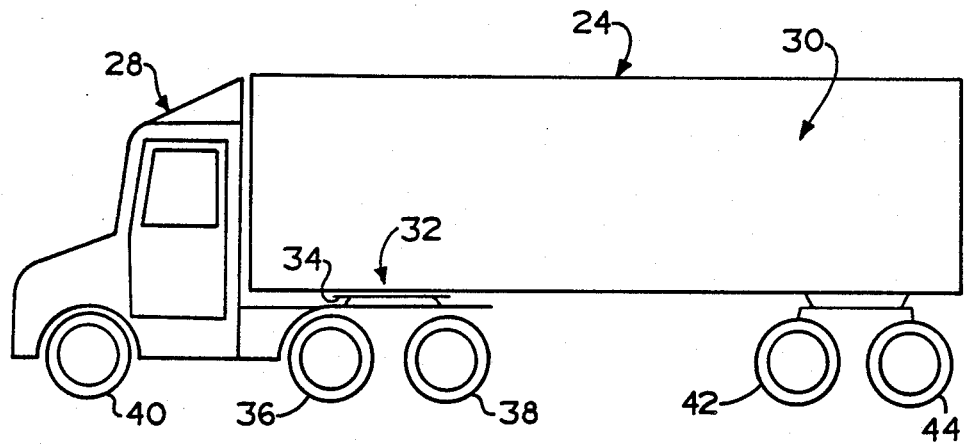
FIG. 1 is a schematic illustration of a multiple vehicle system in which the brake control system of the present invention may be utilized.

The brake control system of the present invention is applicable to multiple vehicle systems such as the tractor-trailer system 24 illustrated in FIG. 1. The tractor-trailer system 24 illustrated in FIG. 1 comprises a tractor 28 and a semi-trailer 30 attached thereto by a connecting means 32 which comprises the well known fifth wheel 34 fixed to the tractor for selective engagement with a king pin fixed to the trailer. The tractor typically comprises a pair or tandem set of rear drive axles 36, 38 and a front steer axle 40. The trailer 30 typically comprises a tandem set or pair of non-steerable non-driven trailer axles 42 and 44. Typically, but not necessarily, the front axle 40 has non-driven steerable wheels.

The braking system of the present invention, relates to a multiple vehicle system such as tractor-trailer system 24, and involves the inter-vehicle braking effort distribution between tractor 28 and trailer 30.

Providing a braking system control, preferably a computer controlled braking system, that can alter braking effort distribution based upon the current state of the vehicle, the environment and the desired output is advantageous. By utilizing an electrically controlled brake system with feedback, optimal response speed and accuracy of the system is possible. Importantly, these features can be provided for tractor and trailer combinations, somewhat independent of the condition of the brakes on each of the individual sub-vehicles.

The brake control system illustrated in FIG. 2 includes a control unit 70, which for purposes of flexibility and responsiveness is preferably an electronic microprocessor based control unit having means 72 for receiving a plurality of input signals, means for processing the input signals in accordance with predetermined logic rules, and means 74 for issuing command output signals to various system operators.

An input signal indicative of the deceleration of the vehicle may be provided by means of a decelerometer 80 which is fixed to the trailer. Force sensors 170 and 172 are utilized to provide input signals indicative of the horizontal ($H_F$) and vertical ($V_F$) forces at the king pin/fifth wheel connection. The force sensors may be strain gauge based and/or of the linearly variable displacement transducer type as is well known.

The central processing unit 70 will, as will be explained in greater detail below, process the input signals in accordance with predetermined logic rules to generate command output signals to the control valve 198.

As shown in FIG. 2, the trailer includes a king pin 176 for selective engagement and disengagement to the tractor fifth wheel 34 as is well known in the prior art. The trailer includes a supply tank 178 connected to the tractor air system by means of a fluid connection 180. Trailer axles 42 and 44 support trailer wheels 182, 184, 186 and 188, each of which is provided with an air brake 190, 192, 194 and 196, respectively. Typically, all of the trailer brakes are controlled at the same pressure by means of a relay valve 198, which has an inlet 200 connected to the trailer supply tank 178, and a pilot valve portion 202 for receiving a pilot signal from a control such as CPU 70. Connector 204 is designed for connection with a connector on the tractor which provides an air signal intended for the pilot valve portion of a prior art standard trailer brake relay valve. Typically, the connectors 204 and 180 form the fluid connection are known as the "glad hand".

As may be seen from the equilibrium force diagrams of FIG. 4, which do not include the aerodynamic or transient forces:

$$H_1 = -M_1 a + H_F$$

$$V_1 = M_1 g + V_F$$

$$H_2 = -M_2 a - H_F$$

$$V_2 = M_2 g - V_F$$

where
- $M_1$ = mass of tractor 20
- $M_2$ = mass of trailer 30
- $H_1$ = braking force of tractor 28;
- $H_2$ = braking force of trailer 30;
- $H_F$ = horizontal force at fifth wheel 34/ king pin 178;
- $V_1$ = weight supported by tractor axles;
- $V_2$ = weight supported by trailer axles;
- $V_F$ = weight on fifth wheel;
- g = gravity
- a = forward acceleration At tractor-trailer proportional braking conditions, the braking ratio of the tractor (taken as a unit) will be equal to the braking ratio of the trailer (taken as a unit), or;

$$H_1/V_1 = H_2/V_2$$

Additionally, the braking ratio of the interconnecting assembly ($H_F/V_F$) will equal the same value, i.e.:

$$H_F/V_F = H_2/V_2 = H_1/V_1$$

Given the above relationships, it may be seen that, if $H_F/V_F = -a$, then tractor-trailer proportional braking is achieved. Accordingly, by modulating the pressure applied to the trailer brakes (control of valve 198) to minimize the error equation:

$$E = H_F/V_F * C + a$$

tractor-trailer proportional braking, regardless of the load on the trailer, is provided and requires no additional sensors and/or control devices on the tractor. The term "C" is a weighing factor.

Vehicle acceleration/deceleration can also be measured by use of wheel speed sensors if proper allowance is made for slip. Of course, by using the vehicle acceleration/deceleration measurement device 80 in combination with the wheel speed sensors, a very accurate determination of wheel slip may be calculated.

Figure 5:
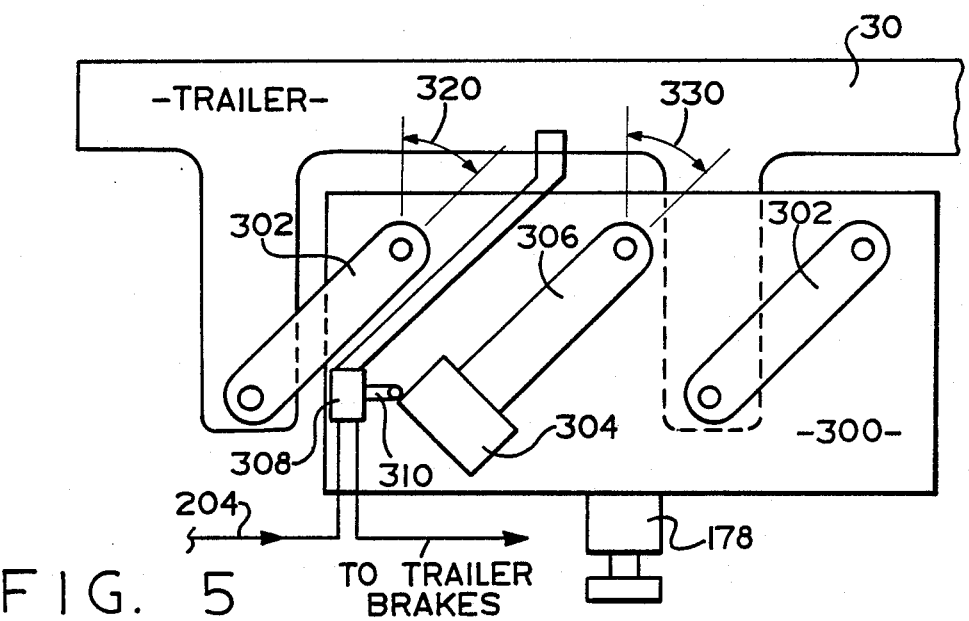
FIG. 5 is a schematic illustration of an alternate control device for the brake control system of the present invention.

An alternate, totally mechanical system, attached solely to the trailer 30, for maintaining tractor-trailer proportional braking by modulating air pressure to the trailer brakes to minimize the equation:

$$E = H_F/V_F * C + a,$$

is illustrated in FIG. 5.

The king pin 178 is mounted to the trailer 30 by a carriage 300 pivotably supported on the trailer by a pair of links 302. A mass 304 is pivotally mounted to the trailer 30 by a link 306. A valve 308 for controlling the supply of air to the trailer axle brakes is mounted to the carriage and is controlled by a horizontally extending valve plunger 310 fixed to link 306 for horizontal movement therewith. Valve 308 will replace the valve 198 illustrated in FIG. 2.

Links 302 define an angle 320 relative to vertical while line 306 defines an angle 330 relative to vertical. Briefly, the tangent of angle 330 is proportional to vehicle deceleration a while the tangent of angle 320 is proportional to the ratio $V_F/H_F$. Thus, if properly sized, at tractor-trailer proportional braking, (i.e. when $H_F/V_F=-a$), the tangent of angle 330 will equal the tangent of angle 320.

When the tractor brakes are applied with greater braking ratio than the trailer brakes, both the mass 304 and the fifth wheel carriage 300 will swing forward with angle 320 being greater than angle 330. This will cause valve plunger 310 to increasingly extend into the valve 308 to increase the pilot air pressure in line 206 to the trailer control valve pilot port 202. If the trailer brake ratio is greater than the tractor brake ratio, angle 330 will be greater than angle 320 and plunger 310 will decreasingly extend into control valve 308 to decrease the pressure supplied to the trailer brakes.

A braking system for a multi-vehicle system, such as a tractor-trailer semi-truck 24 is provided that allows the inter-tractor-trailer braking effort to be distributed in a manner to achieve inter-tractor-trailer proportional braking while utilizing special sensors and controls located solely on the trailer.

While the preferred embodiments of the present invention have been described in connection with specific apparatus, the descriptions are made by way of example only and not as limitations on the spirit and scope of the invention as hereinafter claimed.

I claim:

1. A method for controlling the brake system on a tractor-trailer vehicle having a fifth wheel/king pin connecting structure and individually controllable tractor and trailer sub-vehicle brake systems, said method characterized by;
    (a) sensing from a location on said trailer sub-vehicle the value of a parameter indicative of the vertical force exerted on the fifth wheel king pin/connection;
    (b) sensing from a location on said trailer sub-vehicle the value of a parameter indicative of the horizontal force exerted by the king pin on the fifth wheel;
    (c) sensing from a location on said trailer sub-vehicle the value of a parameter indicative of the acceleration of the vehicle;
    (d) modulating the braking forces exerted by the trailer sub-vehicle brake system only to minimize the value of the expression;

$$E = a \text{ function of } (H_F/V_F)[*C] + a$$

where:
E = error;
$H_F$ = horizontal force at fifth wheel/king pin connection;
$V_F$ = load on fifth wheel; and,
a = forward acceleration of vehicle (expressed in units of gravity).

2. The method of claim 1 wherein the steps of (a) and (b) comprise sensing the value of a parameter indicative of the value of the ratio:

$$H_F/V_F.$$

3. A control system for a tractor-trailer brake system on a tractor-trailer vehicle having an independently controllable tractor sub-vehicle brake system, a fifth wheel connection for engaging a king pin carried by a trailer sub-vehicle and an individually controllable trailer sub-vehicle brake system, said control system characterized by:
    first sensing means mounted on said trailer sub-vehicle for providing an input signal indicative of the value of the ratio of the horizontal force to the vertical force at the fifth wheel/king pin connection,
    second sensing means mounted on said trailer sub-vehicle for providing an input signal indicative of the acceleration of the vehicle;
    a control unit mounted on said trailer sub-vehicle having means for receiving said input signals and for processing said signals in accordance with predetermined logic rules to issue command output signals and actuators responsive to said command output signals for modulating a controlled parameter at the trailer sub-vehicle brake system related to the brake force at the trailer sub-vehicle brake system;
    said control unit including means for modulating the braking forces at said trailer sub-vehicle brake system only to minimize the value of the expression;

$$E = a \text{ function of } (H_F + (V_F * a))$$

where:
E = error;
$H_F$ = horizontal force at fifth wheel/king pin connection;
$V_F$ = load on fifth wheel; and,
a = forward acceleration of vehicle (expressed in units of gravity).

4. The control system of claim 3 wherein said first sensor means comprises transducers sensing strains in said king pin.

* * * * *